3,275,303
BLENDING
Robert R. Goins, Bartlesville, Okla., assignor to Phillips Petroleum Company, a corporation of Delaware
Filed Oct. 5, 1964, Ser. No. 401,423
6 Claims. (Cl. 259—95)

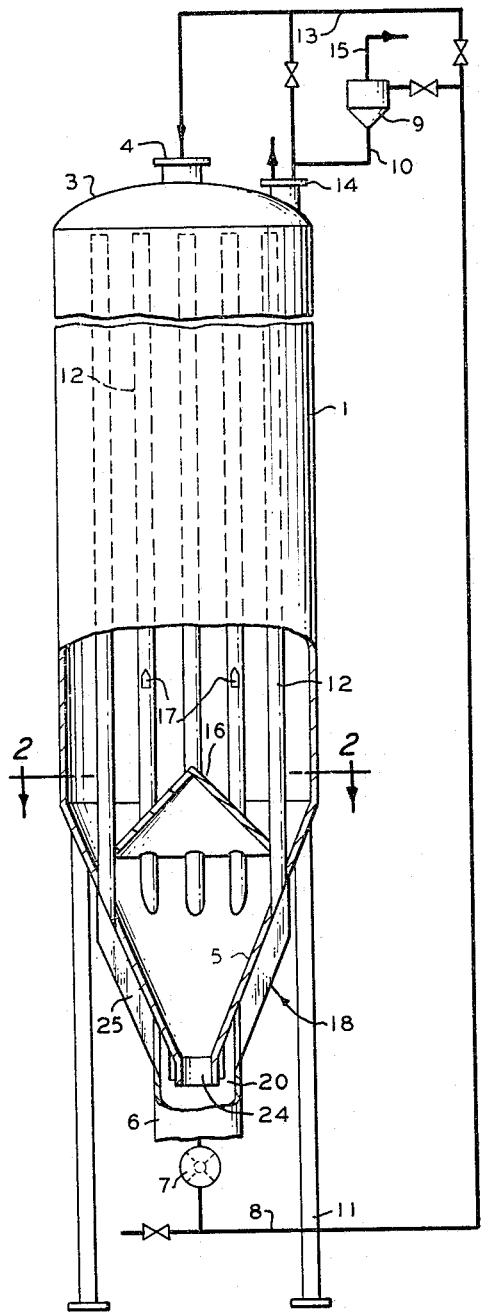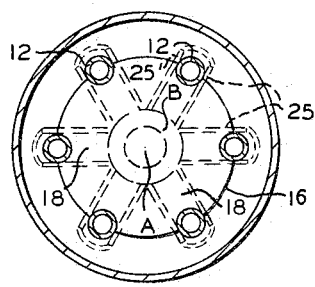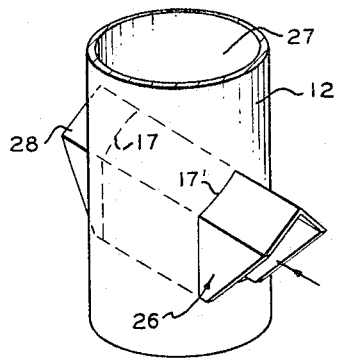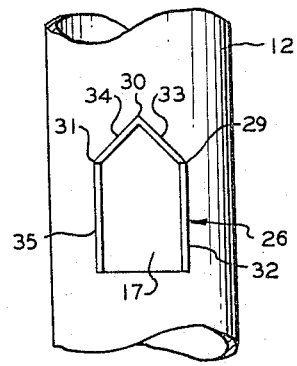
FIG. 1
FIG. 2
FIG. 3
FIG. 4
INVENTOR.
R. R. GOINS
BY Young & Quigg
ATTORNEYS United States Patent Office 3,275,303
Patented Sept. 27, 1966

This invention relates to the blending or homogenization of flowable particulate solids. In one aspect it relates to improved apparatus for effecting such blending.

In my copending application Serial No. 339,985, filed January 24, 1964, now Patent #3,216,629, there is disclosed a novel apparatus for blending flowable particulate solid materials. While this apparatus gives highly satisfactory results and represents a marked improvement over the blending devices previously known in the art, I have now discovered that even more improved blending can be achieved by utilizing as the internal upright conduits of the blending apparatus set forth in Serial No. 339,985, now Patent #3,216,629, the modified conduits of the present invention as hereinafter described.

Accordingly, it is an object of the present invention to improve the blending of solids, particularly in large quantities. Another object of the invention is to provide improved apparatus for the blending of particulate solids. A further object of the invention is to further increase the efficiency of blending of flowable particulate solid material.

Other aspects, objects, advantages and features of the invention will be readily apparent to those skilled in the art from the following description, the appended claims, and the drawings, in which:

FIGURE 1 is an elevation, partly in section, of a blending apparatus having upright drain tubes and a conical baffling therein;

FIGURE 2 is a cross-sectional view of the blending apparatus of FIGURE 1 at section 2—2 showing baffling for varying the flow ratios of the particles from various sections of the tank;

FIGURE 3 is a side view of the portion of an upright conduit of the blender of FIGURE 1 showing the upwardly convex baffling in same; and FIGURE 4 is an end view of the upwardly convex baffle positioned in a portion of an upright conduit of FIGURE 1.

In accordance with the present invention I have discovered that by use of an upwardly convex baffle surface which extends through the upright conduits of a blender such as disclosed in Serial No. 339,985, now Patent #3,216,629, at diametrically opposite openings therein, as further described below, solids can be introduced into the tube from a much wider area of the tank and thus aid in the prevention of non-uniform flow of solids through the tank into the collecting conduits. In addition, the openings in the upright conduits are greatly strengthened due to the baffle extending through them and, therefore, there is provided a more durable structure without the necessity of additional reinforcement being placed within the blender tank. In addition, the modified conduit of this invention has the further advantage of providing balanced flow into the conduit from each side and thus avoids side thrust normally experienced with pellets or solids entering a single opening. There is thus avoided the tendency of the conduit to bend.

The blending apparatus of this invention comprises a chamber having an inlet and an outlet at substantially opposite ends thereof, a downwardly concave conical baffling means in a lower part of said chamber and spaced from the bottom of said chamber, at least one upright conduit positioned within said chamber to provide a passageway around or through said baffling means and at least one pair of opposite openings in each of said conduits at a level above said conical baffling means which are further provided with an upwardly convex baffle means which traverses the internal diameter of the upright tube and extends through the opposing openings and outwardly from the external circumference of the conduit so as to form a hood around at least the top of the openings.

The invention can best be described in conjunction with a description of the various figures.

The apparatus illustrated in FIGURE 1 comprises an upright cylindrical tank 1 having a top closure member 3 with an access opening 4 and a conical bottom 5 provided with an outlet 6 in which is star valve 7. Attached to the outlet 6 is a pneumatic conveyor 8 through which particulate material withdrawn from outlet 6 is pneumatically elevated into cyclone separator 9 and returned through eccentric inlet 10 into the upper interior of tank 1. Tank 1 is supported on legs 11. Carrier gas, from a source not shown, is supplied through the inlet of pneumatic conveyor 8 and is withdrawn through outlet 12. Alternatively, cyclone 9 can be bypassed, as by conduit 13, and the solids returned to the upper part of tank 1 through opening 4 and/or 14, the upper tank space acting to separate solids from carrier gas, which can escape through outlet 14. Since pneumatic conveyors are well known in the art, no further description of this member is necessary at this point. Where a one-pass system is preferred, the pneumatic system can be omitted and the mixed particles passed directly from outlet 6 to shipping or extruding facilities or to other use.

Within tank 1 is a conical baffle member 16 spaced from tank bottom 5 and inverse to the shape thereof. Conduits or tube members 12 having holes 17 therein as further described in connection with FIGURE 3 are adapted to the periphery of the conical baffle 16 and extend below the area of the conical baffle 16 and through conical bottom 5. Flow passages such as 18 are so provided, by means of an external cone below said conical bottom or formed by separate external conduits 25 in association with each upright conduit 12, as to form an enclosed flow channel 18 which serves to conduct the material flowing through each of the conduits 12 to the annular zone 20 wherein they rejoin that portion of the material passing through opening 24 from around cone 16. The amount of particles flowing through flow passages 18 relative to that flowing through opening 24 is controlled by the ratio of the area of the annulus 20 to the area of the central flow opening 24. Relative flow rates of particles flowing through the several flow passages 18 are controlled by the spacing of the passages around the cone bottom as shown in FIGURE 2.

As shown in FIGURE 2, which is a cross section of tank 1 at the section 2—2, particles flowing around the baffle 16 will pass through zone A (flow passage 24 of FIGURE 1) and particles flowing through the upright conduits 12 and flow passages 18 defined by side members 25 and 25' into flow zone B (flow passage 20 in FIGURE 1). Flow passages 18 can be of other type construction such as a tube. By varying the relative size of flow zones A and B, the ratio of the flow around baffle 16 and through tubes 12 can be varied.

As shown in FIGURE 3, which is representative of a portion of a conduit 12 as shown in FIGURE 1, hole or slot 17 which has corresponding openings on the opposite side of the tube is provided with upwardly convex baffle member 26 which extends through the internal area 27 of the pipe and extends from the upper edge of the opening 17 and 17' beyond the external diameter of the conduit 12 so as to form a hood area 28 around at least the top of the openings 17 and 17'.

As shown in FIGURE 4, which is an end view of one of the diametrically opposite openings 17 and 17', the upwardly convex baffle member 26 is in a preferred configuration which forms a polyplanar baffle forming three dihedral angles 29, 30 and 31 pointed upward. Each of the plates 32, 33, 34, 35 which form the baffle member 26 is joined as illustrated and is so adapted as to conform to the shape of the opening 17.

In operation the conduit runs full of pellets or other flowable particulate solids. The solids flowing from above pass around the upwardly convex baffle member 26 and solids entering the side of the slot or hood 28 flow into the area under the baffle. Although it is preferred that the baffle extend outwardly from the wall of the conduit as illustrated, it can be flush with the external surface of the conduit. By extending the baffle beyond the wall, the solids can enter the slots from areas some distance away from the tube. This has the advantage that solids flow into the tube from a much wider area and thus helps in preventing non-uniform flow.

EXAMPLE

A blender of the type illustrated in FIGURE 1 having a capacity of 60,000 pounds of polyethylene pellets is provided with six blend tubes, each tube having six inlets therein. Each of the 36 holes is at a different level in the tank so that each of the holes is accepting pellets from a different layer in the tank. The hole area in the tube, each hole being alike, is sized so that about 40 percent of the pellets enter at the hole and 60 percent of the pellets flow down from the holes above. The amount of pellets entering each of the pipes at each hole therein is in the same proportion. Thus the volume of pellets below the second hole is only 60 percent of the total flow through the tube, 40 percent having entered the bottom hole, so that the percentage of flow of pellets entering the second hole is 40 percent of 60 percent, or 24 percent. The pellet flow from above this hole is 60 percent minus 24 percent, or 36 percent. For each tube the percentage of flow through each hole, from bottom to top, is as follows:

|   | Percent |
|---|---|
| 1 (bottom) | 40 |
| 2 | 24 |
| 3 | 14 |
| 4 | 9 |
| 5 | 5 |
| 6 (top) | 8 |

As circulation is continued in the blender the pellets returned to the top of the tank have been through one blend cycle, while pellets near the bottom have not been blended at all and thus are sampled in the largest quantity. In this manner blending is completed faster than if each hole in each tube collected an equal amount of pellets because in this case, pellets from the top of the bed (which have already been blended) would be collected in the same amounts as pellets in the bottom of the bed which are unblended.

The outlet pipes in the bottom of the blender are sized so that 75 percent of the pellet flow from the blender is through the blending tubes and 25 percent from around the baffle and through the bottom of the tank. If it were not for the slowly moving pellets in the bottom of the tank, all of the pellets could be removed through the blending tubes. Therefore the amount of pellets removed from the bottom of the tank depends on the volume of the slowly moving pellets; the larger the area of slowly moving pellets, the greater amount of flow must be taken through the bottom.

It is possible to use the flow area concept as shown above only because all of the tubes and flow channels run full of pellets. Thus the flow rate of pellets (or other solids) is controlled at the blender outlet. The flow ratios described above are constant whatever the flow rate is. In the particular test described, the flow rate (recirculation rate) was 24,000 pounds per hour. The ratio of flow into the conduit and from holes above is controlled by the ratio of the area under the baffle to that of the area outside the baffle.

While the invention has been described in relation to certain specific embodiments of the presently preferred form, the invention is not limited to the specific embodiments illustrated. The various openings and passageways need not be of the configuration illustrated, which is however preferred, but can be of any geometrical configuration which will permit the flow of solids. The invention, moreover, is not limited to the specific number of spacings or openings as illustrated. Likewise, the number of conduits or tubes inserted into the blender tank can be varied as desired. In addition, other conveyor means such as a bucket lift or auger can be substituted for the recycling means illustrated in FIGURE 1. Such recycling means can also be adapted to the various blending tanks illustrated where more than one pass through the blender is required. Likewise is contemplated within the scope of the invention the use of a plurality of such blenders in combination which will result in a blending identical to that achieved wherein a conveyor system is employed in a single tank for recycle of the particles being removed therefrom. The conveyor, regardless of type, can be positioned outside or inside the tank. Where only one pass through the various blender tanks is required, the particles can be removed directly from the outlet and passed on for subsequent use or storage.

Various modifications of this invention can be made, or followed, in view of the foregoing disclosure, without departing from the spirit or scope thereof.

1. Solids blending apparatus comprising, in combination:
    (a) a chamber having an inlet and outlet at substantially opposite ends thereof;
    (b) a downwardly concave baffling means in a lower part of said chamber and spaced from the botom of said chamber;
    (c) at least one upright conduit positioned within said chamber to provide a passageway around said baffling means; and
    (d) at least one pair of diametrically opposite openings having an upwardly convex baffle extending through same in each such conduit at a level above said conical baffling means.

2. Solids blending apparatus comprising, in combination:
    (a) an upright cylindrical tank having a conical bottom, an outlet in said bottom, and top closure means having an inlet therein;
    (b) concial baffling means positioned in a lower part of said tank, being spaced above the bottom of said tank and generally in reverse to the shape of said bottom, thus forming an obstruction to flow through said outlet;
    (c) a plurality of upright conduits within said tank so positioned as to form passageways around said conical baffling means; and
    (d) at least one pair of diametrically opposite openings in the wall of each of said conduits having an upwardly convex baffle surface extending through same.

3. Apparatus according to claim 2 wherein said upwardly convex baffle surface is formed by a polyplanar baffle forming at least one dihedral angle pointed upward.

4. The apparatus of claim 2 wherein means is provided to return to the upper portion of said tank solids removed from the outlet thereof.

5. The apparatus of claim 2 wherein said conical baffling means has associated therewith along its outer periphery a plurality of said upright conduits and wherein said conduits have associated with the lower ends thereof additional baffle means which are so provided as to form channels for the solids passing therethrough to control the ratio of particles passing around said baffles to particles passing through said upright conduits.

6. A conduit suitable for the collection into and passage through same of flowable particulate solids in a blender which comprises an elongated conduit having at least one pair of diametrically opposite openings with an upwardly convex baffle extending across said conduit through both openings and conforming thereto said baffle being of such size as to allow flow of said flowable particulate solids through both of said openings and further outwardly extending beyond the wall of said conduit so as to form a hood around at least the external top of said openings.

References Cited by the Examiner

UNITED STATES PATENTS 3,138,369  6/1964  Bennett et al. _____ 259—95

FOREIGN PATENTS 41,378  12/1929  Denmark.
1,099,856  3/1955  France.

WALTER A. SCHELL, *Primary Examiner.*

R. W. JENKINS, *Assistant Examiner.*